US012521724B2

(12) United States Patent
Paspek et al.

(10) Patent No.: US 12,521,724 B2
(45) Date of Patent: Jan. 13, 2026

(54) SEPARATOR DEVICE

(71) Applicant: Broadview Group International, LLC, Brook Park, OH (US)

(72) Inventors: Stephen Carl Paspek, Broadview Heights, OH (US); Joseph Edward Bork, Westlake, OH (US); Alan Fredrick Schroeder, Cleveland, OH (US); Kris Edelsward, Lockport, NY (US)

(73) Assignee: Broadview Group International, LLC, Brook Park, OH (US)

( * ) Notice: Subject to any disclaimer, the term of this patent is extended or adjusted under 35 U.S.C. 154(b) by 235 days.

(21) Appl. No.: 18/142,188

(22) Filed: May 2, 2023

(65) Prior Publication Data

US 2023/0347357 A1 Nov. 2, 2023

Related U.S. Application Data

(60) Provisional application No. 63/337,584, filed on May 2, 2022.

(51) Int. Cl.

*B02C 13/13* (2006.01)
*B02C 13/10* (2006.01)
*B02C 13/282* (2006.01)
*B02C 13/286* (2006.01)

(52) U.S. Cl.

CPC .............. *B02C 13/13* (2013.01); *B02C 13/10* (2013.01); *B02C 13/282* (2013.01); *B02C 13/286* (2013.01); *B02C 2013/28609* (2013.01)

(58) Field of Classification Search

CPC ....... B02C 13/10; B02C 13/13; B02C 13/282; B02C 13/286; B02C 2013/28609
USPC .......................................................... 209/320
See application file for complete search history.

(56) References Cited

U.S. PATENT DOCUMENTS

| | | | | |
|---|---|---|---|---|
| 2,529,620 A | | 11/1950 | Marnach et al. | |
| 2,633,930 A | | 4/1953 | Carter | |
| 3,973,735 A | * | 8/1976 | Ito | B02C 17/002 241/73 |
| 4,072,273 A | | 2/1978 | Reiniger | |
| 4,268,551 A | | 5/1981 | Moore, Jr. | |

(Continued)

FOREIGN PATENT DOCUMENTS

| | | |
|---|---|---|
| DE | 3343788 | 6/1985 |
| DE | 10107541 | 9/2002 |

*Primary Examiner* — Michael McCullough
*Assistant Examiner* — Jessica L Burkman
(74) *Attorney, Agent, or Firm* — Muir Patent Law, PLLC

(57) ABSTRACT

A rotary impact separator is provided for separating a material. The rotary impact separator includes a body portion comprising one or more walls. The one or more walls define a substantially hollow chamber, an inlet opening, a first outlet opening, and a second outlet opening. The rotary impact separator includes an impact device extending at least partially into the hollow chamber. The impact device includes a shaft that extends within the hollow chamber. The shaft rotates within the hollow chamber. One or more blades are attached to the shaft and contact the material. A diverter is attached to an interior surface of one of the one or more walls. The diverter extends along the shaft and projects from the interior surface toward the shaft. Methods for recovering two or more co-products from a material are provided.

20 Claims, 9 Drawing Sheets

(56) References Cited

U.S. PATENT DOCUMENTS

| | | | |
|---|---|---|---|
| 4,678,076 | A | 7/1987 | Nenakhov et al. |
| 5,722,603 | A | 3/1998 | Costello et al. |
| 5,785,259 | A | 7/1998 | Nishibori |
| 7,225,932 | B2 | 6/2007 | Gencer |
| 7,635,099 | B1 | 12/2009 | Meredith et al. |
| 8,110,131 | B1 | 2/2012 | Dell'Orco et al. |
| 8,864,057 | B2 | 10/2014 | Bork et al. |
| 2008/0206094 | A1 | 8/2008 | Holloway |
| 2008/0213562 | A1 | 9/2008 | Przybylinski et al. |
| 2011/0111456 | A1 | 5/2011 | Medoff |
| 2012/0325943 | A1 | 12/2012 | Levy et al. |
| 2013/0175377 | A1 | 7/2013 | Levy et al. |
| 2015/0021422 | A1 | 1/2015 | Hall et al. |
| 2016/0222292 | A1 | 8/2016 | Shvarzman |
| 2017/0044076 | A1 | 2/2017 | Waters |
| 2017/0058094 | A1 | 3/2017 | Frenkel |
| 2017/0136658 | A1 | 5/2017 | Paspek et al. |
| 2017/0305038 | A1 | 10/2017 | Paspek et al. |
| 2018/0015515 | A1 | 1/2018 | Sivakumar |
| 2019/0077052 | A1 | 3/2019 | Paspek et al. |
| 2019/0078018 | A1 | 3/2019 | Paspek et al. |
| 2019/0176162 | A1 | 6/2019 | Paspek et al. |
| 2019/0344285 | A1 | 11/2019 | Grasso, Jr. et al. |
| 2022/0282400 | A1* | 9/2022 | Sample ............... B02C 13/2804 |
| 2022/0314496 | A1 | 10/2022 | Paspek et al. |

* cited by examiner

SEPARATOR DEVICE

CROSS-REFERENCE TO RELATED APPLICATIONS

The present application claims priority to U.S. Provisional Patent Application No. 63/337,584, filed May 2, 2022, and titled "SEPARATOR DEVICE,", the entire contents of which is incorporated herein by reference in its entirety.

FIELD

The present disclosure relates generally to a separator device for separating a material into multiple co-products.

BACKGROUND

It is known to separate a material into multiple co-products. However, separation of the material can be time-consuming and costly. In addition, inadequate separation of the multiple co-products can occur.

SUMMARY

The following presents a simplified summary of the disclosure to provide a basic understanding of some aspects described in the detailed description.

In aspects, a rotary impact separator for separating a material comprises a body portion comprising one or more walls. The one or more walls define a substantially hollow chamber, and an inlet opening, in communication with the hollow chamber, through which the material is received. The one or more walls define a first outlet opening, in communication with the hollow chamber, through which a first co-product of the material exits the hollow chamber. The one or more walls define a second outlet opening, in communication with the hollow chamber, through which a second co-product of the material exits the hollow chamber. The rotary impact separator comprises an impact device extending at least partially into the hollow chamber defined within the body portion. The impact device comprises a shaft that extends within the hollow chamber. The shaft is configured to rotate within the hollow chamber. The impact device comprises one or more blades attached to the shaft and configured to contact the material and separate the material into the first co-product and the second co-product. The rotary impact separator comprises a diverter attached to an interior surface of one of the one or more walls. The diverter extends along the shaft and projects from the interior surface toward the shaft such that a gap is defined between an end of a first blade of the one or more blades and the diverter. The gap comprises a distance that is less than a distance between the end of the first blade and the interior surface.

In aspects, the diverter extends substantially parallel to the shaft and wherein the distance of the gap is less than about 50 mm when the end of the first blade is in closest proximity to the diverter.

In aspects, the diverter is attached at a top of the body portion such that an axis that is parallel to a direction of gravitational force intersects the diverter and the shaft.

In aspects, the diverter comprises an impact wall that is angled relative to the interior surface to form an angle that is less than 90 degrees. The impact wall is positioned on a rotational side of the first blade.

In aspects, a second diverter is attached to a bottom of the body portion and is positioned opposite the diverter.

In aspects, a baffle is attached to the interior surface and extends along a plane that interests the shaft. The baffle projects from the interior surface toward the shaft and is positioned between the first blade and a second blade of the one or more blades.

In aspects, a first tube is attached to the first outlet opening and defines an enclosed volume, a first pressure device attached to the first tube and configured to generate a negative pressure within the enclosed volume and draw the first co-product from the first outlet opening.

In aspects, a second tube is attached to the second outlet opening, and a second pressure device is attached to the second tube and is configured to generate a negative pressure to draw the second co-product from the second outlet opening.

In aspects, a rotary impact separator for separating a material comprises a body portion comprising one or more walls. The one or more walls define a substantially hollow chamber, and an inlet opening, in communication with the hollow chamber, through which the material is received. The one or more walls define a first outlet opening, in communication with the hollow chamber, through which a first co-product of the material exits the hollow chamber. The one or more walls define a second outlet opening, in communication with the hollow chamber, through which a second co-product of the material exits the hollow chamber. The rotary impact separator comprises an impact device extending at least partially into the hollow chamber defined within the body portion. The impact device comprises a shaft that extends within the hollow chamber, the shaft configured to rotate within the hollow chamber. The impact device comprises one or more blades attached to the shaft and configured to contact the material and separate the material into the first co-product and the second co-product. The rotary impact separator comprises a baffle attached to an interior surface of one of the one or more walls. The baffle extends along a plane that intersects the shaft. The baffle projects from the interior surface toward the shaft and is positioned between a first blade of the one or more blades and a second blade of the one or more blades.

In aspects, a first tube is attached to the first outlet opening and defines an enclosed volume. A first pressure device is attached to the first tube and is configured to generate a negative pressure within the enclosed volume and draw the first co-product from the first outlet opening.

In aspects, a second tube is attached to the second outlet opening. A second pressure device is attached to the second tube and is configured to generate a negative pressure to draw the second co-product from the second outlet opening.

In aspects, a distance separating an end of the baffle and the shaft is less than about 50 mm.

In aspects, methods for recovering two or more co-products from a material are provided. Methods comprise receiving the material within a hollow chamber of a rotary impact separator. Methods comprise passing the material through the rotary impact separator comprising a body portion with one or more walls that define a chamber. An impact device extends through the chamber. A screen covers a first outlet in the body below the impact device relative to the direction of gravity. Methods comprise rotating the impact device within the chamber and contacting the material with the impact device. Methods comprise directing the material around a diverter and a baffle that are attached to the rotary impact separator. Methods comprise separating the material into a first co-product and a second co-product such that the first co-product exits the rotary impact separator through a first outlet opening and the second co-product exits the rotary impact separator through a second outlet opening.

In aspects, methods comprise generating a negative pressure within a first tube that is attached to the first outlet opening such that a first pressure device, which is attached to the first tube, draws the first co-product from the first outlet opening and into the first tube.

In aspects, methods comprise generating a negative pressure within a second tube that is attached to the second outlet opening such that a second pressure device, which is attached to the second tube, draws the second co-product from the second outlet opening and into the second tube.

In aspects, the baffle is positioned between a first blade and a second blade of the impact device such that an axis that is parallel to a shaft of the impact device intersects the baffle, the first blade, and the second blade.

In aspects, a distance separating an end of the baffle and the shaft is less than about 50 mm.

In aspects, the diverter comprises an impact wall that is angled toward the shaft such that the impact wall directs the material toward the shaft.

In aspects, the diverter directs the material downwardly relative to a direction of gravitational force toward the shaft.

In aspects, directing the material comprises directing the material over a second diverter that is positioned opposite the diverter.

Additional features and advantages of the aspects disclosed herein will be set forth in the detailed description that follows, and in part will be clear to those skilled in the art from that description or recognized by practicing the aspects described herein, including the detailed description which follows, the claims, as well as the appended drawings. It is to be understood that both the foregoing general description and the following detailed description present aspects intended to provide an overview or framework for understanding the nature and character of the aspects disclosed herein. The accompanying drawings are included to provide further understanding and are incorporated into and constitute a part of this specification. The drawings illustrate various aspects of the disclosure, and together with the description explain the principles and operations thereof.

BRIEF DESCRIPTION OF THE DRAWINGS

These and other features, aspects and advantages are better understood when the following detailed description is read with reference to the accompanying drawings, in which.

DETAILED DESCRIPTION

Figure 1:
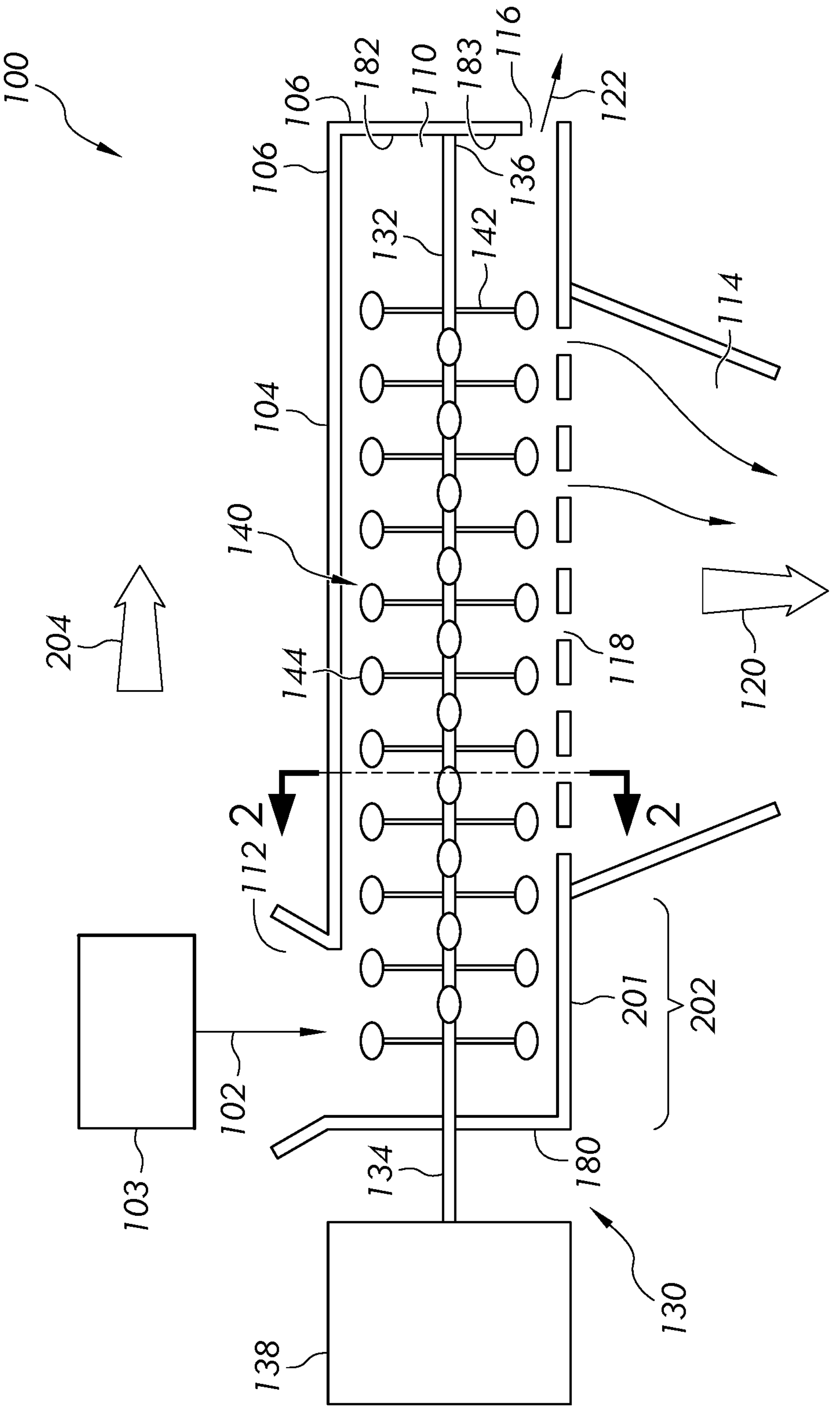
FIG. 1 schematically illustrates a rotary impact separator in accordance with aspects of the disclosure.

Aspects will now be described more fully hereinafter with reference to the accompanying drawings in which example aspects are shown. Whenever possible, the same reference numerals are used throughout the drawings to refer to the same or like parts. However, this disclosure may be embodied in many different forms and should not be construed as limited to the aspects set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, aspects include from the one value to the other value. Similarly, when values are expressed as approximations by use of the antecedent "about," it will be understood that the value forms another aspect. It will be further understood that the endpoints of each of the ranges are significant both in relation to the other endpoint, and independently of the other endpoint.

Directional terms as used herein—for example up, down, right, left, front, back, top, bottom, upper, lower, etc.—are made only with reference to the figures as drawn and are not intended to imply absolute orientation.

Unless otherwise expressly stated, it is in no way intended that any methods set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including matters of logic relative to arrangement of steps, operational flow, order of components, or orientation of components; plain meaning derived from grammatical organization or punctuation, and; the number or type of aspects described in the specification.

As used herein, the singular forms "a," "an," and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising," "including," and variations thereof shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. The term "substantially" may denote values within about 10% of each other, for example, within about 5% of each other, or within about 2% of each other.

Modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first end and a second end generally correspond to end A and end B or two different ends.

Unless otherwise indicated, the terms "distal" and "proximal" are used in the following description with respect to a position or direction relative to the treating clinician. "Distal" and "distally" are positions distant from or in a direction away from the clinician, and "proximal" and "proximally" are positions near or in a direction toward the clinician.

Referring to FIG. 1, a rotary impact separator 100 (hereinafter "separator") is illustrated. The separator 100 can be used to separate a material into one or more products (e.g., a first co-product, a second co-product, etc.). For example, the separator 100 can break a bond between an adhesive and a fibrous material, separate adhesive granules from the fibrous material, separate different types of fibrous materials, etc. It will be appreciated that the separator 100 illustrated in FIG. 1 is merely exemplary and comprises only one of a number of different embodiments. In other examples, the separator 100 may have different sizes, shapes, constructions, configurations, etc.

In the illustrated example, the separator 100 may receive material 102 from a source 103. The material 102 may comprise, for example, recycled carpet, nylon, polyethylene terephthalate (PET), polypropylene (PP), a turf material, agricultural plastics, recycled plastics, paper and plastic blends, and/or mixtures thereof. The material 102 can be supplied from a source 103 to the separator 100.

The separator 100 comprises a body portion 104. The body portion 104 extends along a body axis and comprises one or more walls 106. The walls 106 can be hard faced to limit premature wear for applications that involve abrasive materials. The body portion 104 can have any number of shapes. In an example, the body portion 104 may be substantially hollow, such that the walls 106 can define a substantially hollow chamber 110. The chamber 110 is sized to receive the material 102 from the source 103. In an example, the body portion 104 can extend substantially parallel to a floor, though, in other examples, may extend substantially perpendicular to the floor. The body portion 104 may have a length to diameter ratio of at least 1 to 1, and, in some examples, 4 to 1, and, in other examples, 6 to 1 or more. The cross-section of the chamber 110 can comprise a rounded bottom portion (e.g., relative to a direction of gravity) and a top portion that may be square, rectangular, etc. Accordingly, methods for recovering two or more co-products 120, 122 from the material 102 can comprise receiving the material 102 within a hollow chamber 110 of the rotary impact separator 100.

The body portion 104 can define one or more openings through which the material 102 can enter the chamber 110. For example, the body portion 104 may have an inlet opening 112. The inlet opening 112 can be positioned in proximity to the source 103. As such, the material 102 can be provided from the source 103 to the chamber 110 through the inlet opening 112. In the illustrated example, the inlet opening 112 is located substantially underneath the source 103, such that the material 102 can fall (e.g., due to the effects of gravity) from the source 103 and through the inlet opening 112. In other examples, the source 103 could be positioned at other locations with respect to the body portion 104, such as along a side of the body portion 104, etc. The inlet opening 112 can also receive material pneumatically or from a metering device. While the inlet opening 112 is illustrated as being located at an end of the body portion 104 adjacent to a motor 138, such a location is not intended to be limiting. In aspects, the inlet opening 112 is located at a top of the body portion 104 (e.g., relative to the direction of gravity, with gravity acting downwardly in FIG. 1). Accordingly, the inlet opening 112 is in communication with the hollow chamber 110, with the material 102 received through the inlet opening 112 and into the hollow chamber 110. Methods can comprise passing the material 102 through the rotary impact separator 100 comprising the body portion 104 with one or more walls that define the chamber 110.

The body portion 104 can define two or more outlet openings. For example, the body portion 104 may have a first outlet opening 114 and a second outlet opening 116. In the illustrated example, one or both of the first outlet opening 114 or the second outlet opening 116 can be located on an opposing circumferential side from the inlet opening 112 and/or the source 103. For example, the inlet opening 112 and/or the source 103 may be positioned along a top of the body portion 104 (e.g., at a first location) while the first outlet opening 114 and/or the second outlet opening 116 may be positioned along a bottom of the body portion 104 (e.g., at a second location that is about 180 degrees from the first location) relative to the direction of gravity. In aspects, the outlet opening 114 may be located at an end of the body portion 104, for example, by passing through an end wall 183 that is substantially perpendicular to a shaft 132.

In an example, co-products 120, 122 of the material 102 can exit the chamber 110 by passing through the first outlet opening 114 and/or the second outlet opening 116. In this way, the first outlet opening 114 and the second outlet opening 116 are in communication with the hollow chamber 110 and can receive the co-products 120, 122 from the hollow chamber 110 and through the outlet openings 114, 116 (e.g., exiting the outlet openings 114, 116). In an example, the first outlet opening 114 and the second outlet opening 116 may be located at different axial locations along the length of the body portion 104. For example, the first outlet opening 114 may be located towards a center of the body portion 104 and/or in closer proximity to the inlet opening 112 than the second outlet opening 116. The second outlet opening 116 may be located towards an end of the body portion 104 at an opposite end of the body portion 104 from the inlet opening 112. In this example, the first outlet opening 114 and the second outlet opening 116 may be located at an under side of the body portion 104 opposite from the inlet opening 112 (e.g., which may be located at a top side of the body portion 104). Accordingly, moving in an axial direction along the shaft 132 from the inlet opening 112, the first outlet opening 114 may be encountered first (e.g., due to being located toward a center of the body portion 104) and the second outlet opening 116 may be encountered second (e.g., due to being located at the end wall 183. In aspects, an axis that is parallel to the shaft 132 can intersect the second outlet opening 116 while not intersecting the inlet opening 112 or the outlet opening 114. Accordingly, methods can comprise separating the material 102 into the first co-product 120 and the second co-product 122 such that the first co-product 120 exits the rotary impact separator 100 through the first outlet opening 114 and the second co-product 122 exits the rotary impact separator 100 through the second outlet opening 116.

Figure 3:
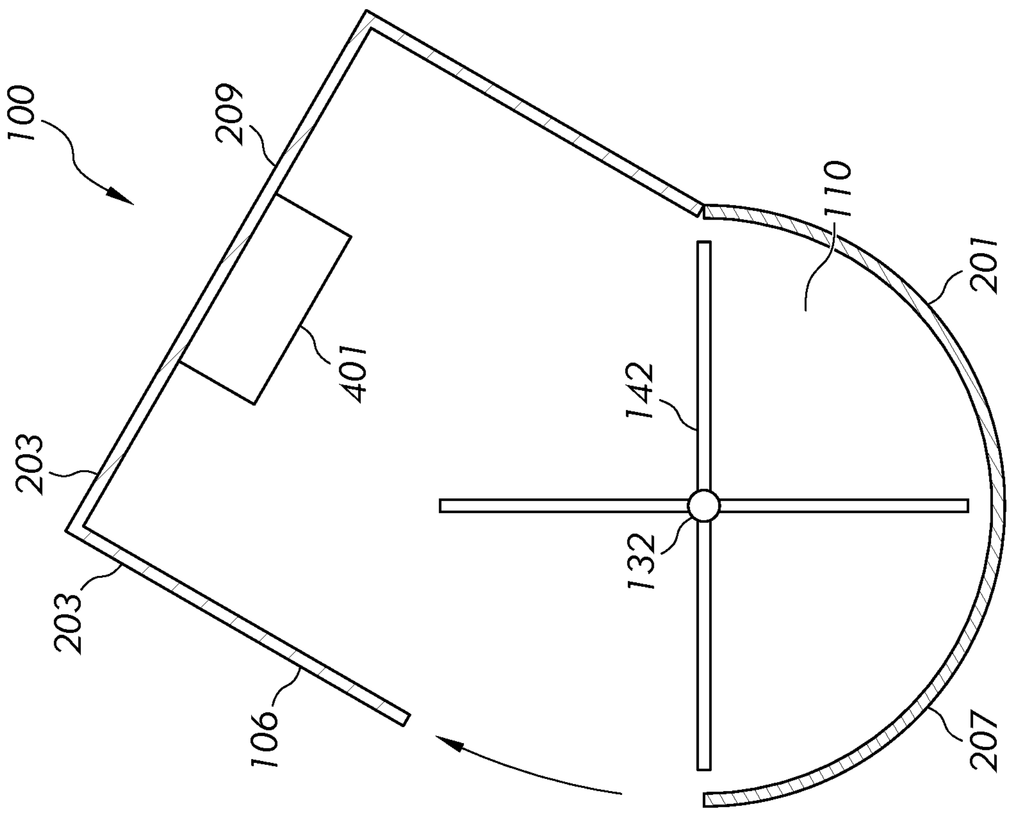
FIG. 3 schematically illustrates portions of the rotary impact separator in accordance with aspects of the disclosure.
Figure 2:
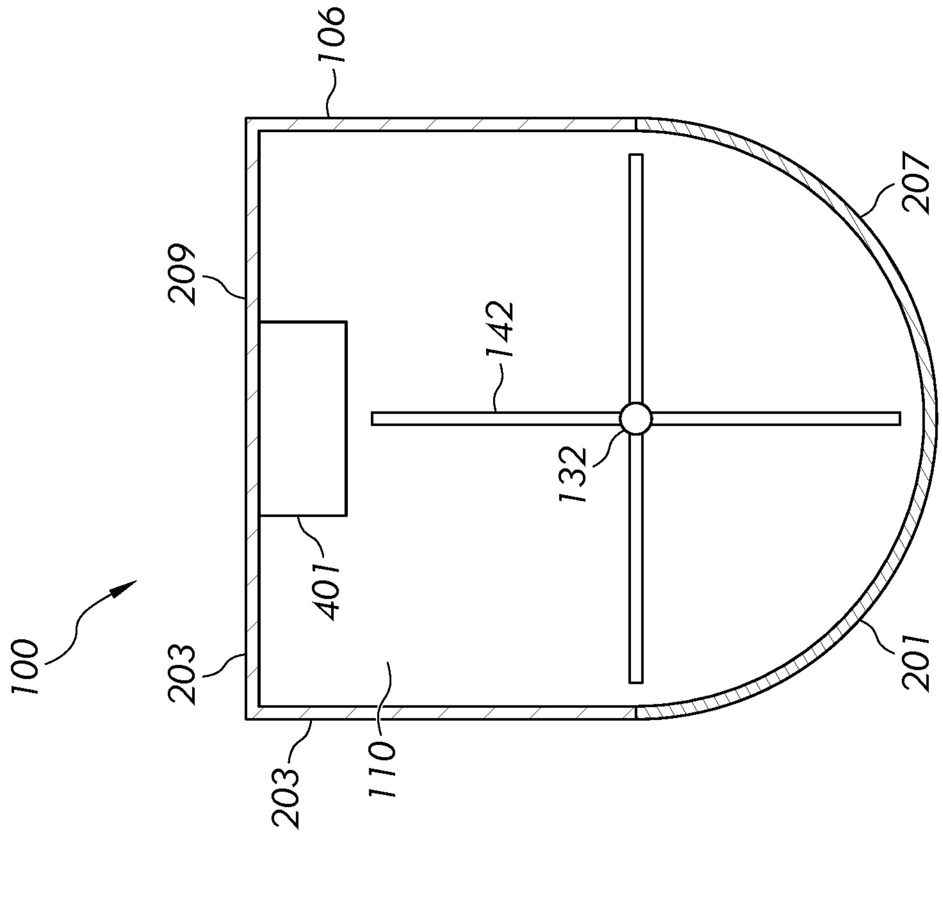
FIG. 2 schematically illustrates portions of the rotary impact separator along lines 2-2 of FIG. 1 in accordance with aspects of the disclosure.

FIG. 2 illustrates a cross-sectional illustration of the body portion 104 along lines 2-2 of FIG. 1. In aspects, the walls 106 can comprise a bottom wall 201 and top walls 203. The bottom wall 201 can form a bottom portion 207 of the body portion 104 while the top walls 203 can form a top portion 209 of the body portion 104. In aspects, the bottom wall 201 can be rounded and may comprise a radius of curvature. The top walls 203 forming the top portion 209 may, in aspects, be non-rounded, such as by extending along planes that form a square or rectangular shape. As used herein, the terms "top" and "bottom" are in relation to a direction of gravitational force. As illustrated in FIG. 3, the top portion 209 may be movable relative to the bottom portion 207, such that the top portion 209 can be pivoted/rotated relative to the bottom portion 207. For example, one of the top walls 203 can be pivotably attached to the bottom wall 201, such that the top portion 209 can be moved between a closed position (e.g., illustrated in FIG. 2) and an opened position (e.g., illustrated in FIG. 3). In the opened position, access to the chamber 110 is facilitated. In the closed position, the separator can be in an operational mode.

Referring to FIGS. 1-3, in aspects, the first outlet opening 114 and the second outlet opening 116 can have different sizes. For example, the first outlet opening 114 can have a larger size (e.g., length, width, etc.) than the second outlet opening 116. Such a size difference may be provided to accommodate for a difference in amount of material 102 that passes through the first outlet opening 114 and the second outlet opening 116. Focusing upon the first outlet opening 114, a screen 118 may be disposed within the first outlet opening 114 and/or covering the first outlet opening 114. In such an example, the screen 118 can selectively filter a first co-product 120 of the material 102. The screen 118 can be attached to one or more walls 106 of the body portion 104 adjacent to the first outlet opening 114. As such, the first co-product 120 can pass through the screen 118 while passing from the chamber 110 and through the first outlet opening 114. The screen 118 may have one or more holes that define openings through which the first co-product 120 can pass through. The screen 118 can therefore function to filter at least some of the first co-product 120 from the material 102. To increase screening area, it is possible to fit either of the long walls 106 or the top of the unit with screening means. Such an arrangement can be useful if long axis of the unit is located perpendicular to the building floor.

In aspects, the first outlet opening 114 and the screen 118 may be located downstream from an inlet end 180 of the body portion 104, wherein the inlet end 180 comprises the end at which the material 102 enters the chamber 110 through the inlet opening 112. For example, the bottom wall 201 may be substantially solid to form a solid portion 202 that extends between the inlet end 180 and the first outlet opening 114. The solid portion 202 may be located upstream from the first outlet opening 114 relative to a travel direction 204 of the material 102 within the chamber 110, such that the solid portion 202 is located between the inlet end 180 and the first outlet opening 114. In aspects, the solid portion 202 may be devoid of openings and may comprise a closed wall. The solid portion 202 can be located underneath the inlet opening 112. For example, when the material 102 first enters the chamber 110 through the inlet opening 112, the material 102 may be in a heavier, denser state since the material 102 may not have been broken up yet. In this state, damage to a screen is possible. To limit damage, the solid portion 202 can contact the material 102 and may be substantially impervious to damage, with the material 102 moving from the solid portion 202 downstream in the travel direction 204. When the material 102 reaches the first outlet opening 114, the material 102 may be in a smaller and less dense state, which may be less damaging to the screen 118.

In an example, the screen 118 may comprise a floor of the body portion 104, such as a floor with one or more holes to allow for small particles to exit. In such an example, the wall or floor may comprise a perforated material or screening means to allow for the small particles to exit. These small particles may exit by a combination of gravitational forces and centrifugal forces. The size, shape, and arrangement of the openings may depend on a particular application. For example, in the removal of fine granules from fiber, the screen 118 may comprise a punched plate with very fine holes to allow for the removal of the fine granules with a minimal loss of fiber. In another example, for the separation of carpet tufts from long polypropylene threads, a larger sized screen opening may optimally be employed with openings sufficiently large to pass the tufts. The screen 118 can be a perforated plate, a woven screen, a slotted screen, or a combination of the above. In an example, a smooth punched plate may allow for faster axial passage of the material 102 through the chamber 110, and increase throughput, while a woven screen may tend to retard flow, decrease throughput, but can also result in more impacts and/or a cleaner separation. In some examples, it may be beneficial to vary the screen 118 type, or the hole size from the inlet to the exit of the chamber 110. Using screens of varying hole sizes can allow for the generation of more than two product streams from a single unit.

In some examples, the screen 118 can be easily removable to facilitate cleaning facile servicing of the chamber 110. Finer screens 118 may tend to be thinner than coarser screens 118, since one typically does not want the thickness of the screens 118 to be greater than the diameter hole. Thinner screens 118 may lack mechanical strength, especially when resisting the impact of centrifugally accelerated particles. Consequently, for finer screens 118, it may be useful to use a coarser screening means as a backing to provide mechanical support for the thinner finer screens 118. Further, a position of the screen 118 can be reversed, such that wear and tear at specific locations of the screen 118 can be avoided.

The second outlet opening 116 may be located at an exit end 182 of chamber 110. The second co-product 122 of the material 102 can pass through this outlet by centrifugal force or by pneumatic force. The choice of location depends on the material being separated and the location of the inlet of the next unit downstream of the rotary impact separator 100. In a possible example, the second outlet opening 116 may be formed within an end wall of the body portion 104, such that the second co-product 122 can exit through the second outlet opening 116 and through the end wall 183 of the body portion 104 in a direction that is substantially parallel to the shaft 132. For example, the second outlet opening 116 can be located between (e.g., or at a junction of) the bottom wall 201 and the end wall 183. As will be described below, the second outlet opening 116 may be partially covered by a gate to control a flow of the second co-product 122 through the second outlet opening 116.

The second outlet opening 116 may not be covered with a screen. In an example, the second co-product 122 of the material 102 can pass from the chamber 110 and through the second outlet opening 116. The second co-product 122 may include portions of the material 102 that are not contained as part of the first co-product 120. In some examples, due to the presence of the screen 118 in the first outlet opening 114, the first co-product 120 may comprise a finer material than the second co-product 122. As such, the second co-product 122 may comprise a coarser product than the first co-product 120. In these examples, portions of the material 102 that do not pass through the first outlet opening 114 as part of the first co-product 120 may pass through the second outlet opening 116 as part of the second co-product 122.

The rotary impact separator 100 may comprise an impact device 130 for separating the material 102 into the first co-product 120 and the second co-product 122. The impact device 130 may be positioned to extend at least partially within and/or into the chamber 110 of the body portion 104. As such, the impact device 130 can contact, impact, etc. the material 102 when the material 102 is located within the chamber 110. Methods can comprise rotating the impact device 130 within the chamber 110 and contacting the material 102 with the impact device 130.

The impact device 130 comprises a shaft 132 that extends within the hollow chamber 110. The shaft 132 can extend between a first end 134 and a second end 136. The first end 134 of the shaft 132 may be positioned at an exterior side of the body portion 104 adjacent to the inlet end 180. The second end 136 may be positioned at an interior of the body portion 104 within the chamber 110. The shaft 132 can extend substantially linearly between the first end 134 and the second end 136. In an example, the shaft 132 can be formed of a substantially rigid and/or non-flexible material that is limited from inadvertent bending, flexing, fracture, etc. The shaft 132 may comprise any number of materials, including metal materials, non-metal materials, plastic materials, composites, etc.

The first end 134 of the shaft 132 may be coupled to a device that can impart movement to the shaft 132. In an example, the first end 134 may be coupled to a motor 138. It will be appreciated that the motor 138 may include any number of movement imparting structures. For example, the motor 138 may comprise gears, drives, sheaves, belts, DC motors, AC motors, asynchronous motors, synchronous motors, etc. In these examples, the motor 138 can cause the shaft 132 to rotate. A user can set and/or adjust the motor 138 to control movement of the shaft 132. For example, the user can set and/or adjust the motor 138 output speed so as to control the rotational speed of the shaft 132.

The impact device 130 may comprise one or more effect structures 140 coupled to the shaft 132. In an example, the effect structures 140 are provided to contact the material 102 within the chamber 110. By contacting the material 102, the effect structures 140 can more effectively disassemble the material 102 and separate the material 102 into the first co-product 120 and the second co-product 122. In addition, since the effect structures 140 are coupled to the shaft 132, the effect structures 140 can be rotated due to the rotation of the shaft 132.

The effect structures 140 may comprise one or more blades 142 and, in aspects, an end effect 144. The one or more blades 142 may be attached to the shaft 132 and can contact the material 102 and separate the material 102 into the first co-product 120 and the second co-product 122. In aspects, the blades 142 may be substantially identical in size, shape, and structure, but for the differing locations of the blades 142 relative to the shaft 132, for example, with blades 142 spaced circumferentially apart about the shaft 132 and blades 142 spaced axially apart along the length of the shaft 132. The blades 142 may be coupled to the shaft 132. In some examples, the blade 142 may be substantially perpendicular with respect to the shaft 132. In other examples, the blade 142 may be angled with respect to the shaft 132, such as by forming an angle that is between about 10 degrees to about 80 degrees with respect to the shaft 132. The blade 142 can be formed of a substantially rigid and/or non-flexible material that is limited from inadvertent bending, flexing, fracture, etc. The blade 142 may comprise any number of materials, including metal materials, non-metal materials, plastic materials, composites, etc. The blade 142 can extend a distance from the shaft 132 towards the walls 106 of the body portion 104. In aspects, one or more of the blades 142 can be substantially flat, and can extend along a single plane, wherein the plane is substantially perpendicular to the shaft 132. In aspects, one or more of the blades 142 can be twisted such that the twisted blades 142 can extend along a plurality of planes, or the twisted blades 142 can extend along a plane that is non-perpendicular to the shaft 132. In aspects, the twisted blades 142 can be referred to as "drivers" and can function to drive the material 102 in a direction, for example, away from the inlet opening 112. In aspects, the twisted blades 142 (e.g., drivers) can be twisted about 45 degrees (e.g., relative to the non-twisted flat blades 142).

Figure 4:
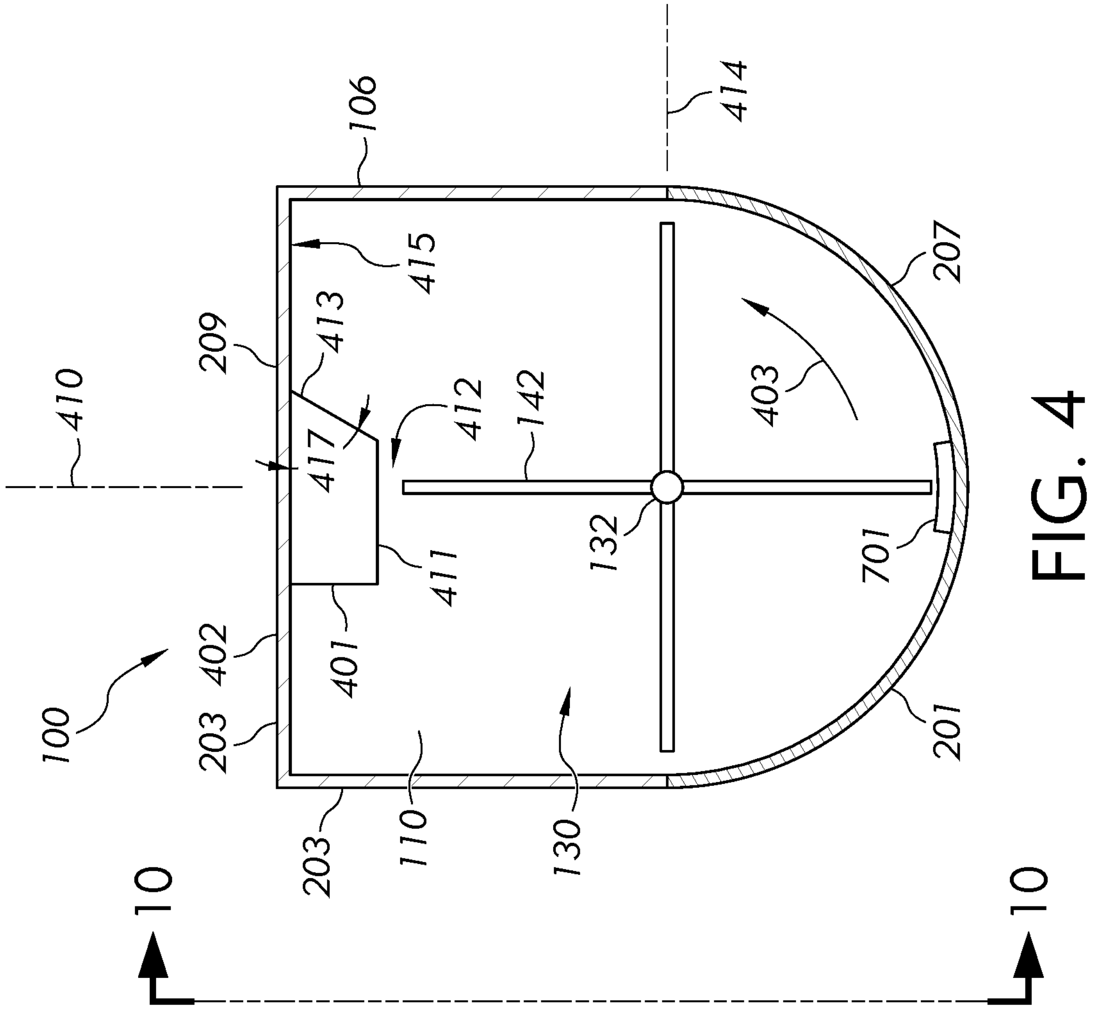
FIG. 4 schematically illustrates portions of the rotary impact separator in accordance with aspects of the disclosure.

One or more end effects 144 can be coupled to the blade 142. In an example, the end effects 144 can be coupled to an end of the blade 142 that is opposite the shaft 132. The end effects 144 may be provided so as to contact the material 102 when the shaft 132 is rotated. The contact of the material 102 by the end effects 144 can cause the material 102 to separate into the first co-product 120, the second co-product 122, etc. For example, the end effects 144 may be rotated as a result of the rotation of the shaft 132 and resulting rotation of the blade 142. This movement of the end effects 144 can cause contact between the material 102 and the end effects 144. To improve balance, end effects 144 may be installed in pairs, one on each side of the shaft 132. The end effects 144 in a pair can be the same or nearly the same weight. As illustrated in FIGS. 2-4, the blades 142 are not limited to comprising the end effects 144 and, in aspects, may not comprise end effects 144 but, rather, may comprise a substantially constant cross-sectional size and shape along a length of the blades 142 from the shaft 132 to an end of each of the blades 142.

Figure 5:
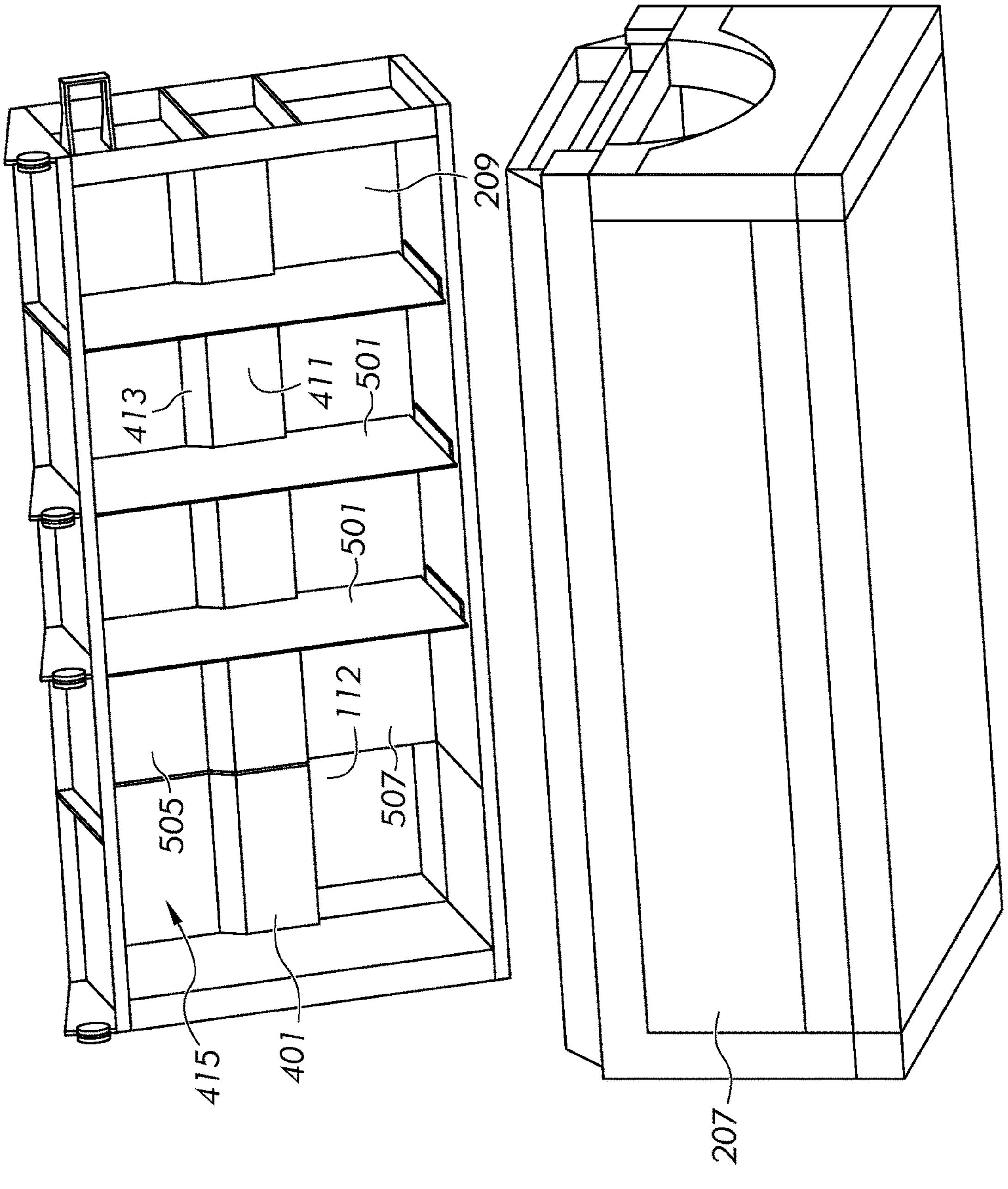
FIG. 5 schematically illustrates portions of the rotary impact separator in accordance with aspects of the disclosure.

Referring to FIG. 4, in aspects, the rotary impact separator 100 can comprise a diverter 401 (e.g., also illustrated in FIGS. 2-3) positioned within the chamber 110 and attached to a top wall 402 of the top portion 209. The diverter 401 can assist in ensuring that the material 102 can contact the impact device 130. For example, the ends of the blades 142 can be spaced a distance apart from the top wall 402, such that a gap may exist between the ends of the blades 142 and the top wall 402. In the absence of the diverter 401, there is a possibility that the material 102 can accumulate above the blades 142 in the gap between the ends of the blades 142 and the top wall 402. If the material 102 accumulates in this area, then there is the possibility that the material 102 may be insufficiently mixed and broken down into the co-products 120, 122. To reduce the likelihood of insufficient contact between the material 102 and the blades 142, the diverter 401 can be attached to the top wall 402 and can extend along the length of the chamber 110 substantially parallel to the shaft 132. That is, in aspects, and as illustrated in FIG. 5, the diverter 401 can extend completely between the inlet end 180 and the exit end 182 of the body portion 104. In this way, in aspects, the distance between the inlet end 180 and the exit end 182 may substantially match the length of the diverter 401, with the diverter 401 extending along an axis that is substantially parallel to the shaft 132 and a longitudinal axis along which the body portion 104 extends.

The diverter 401 can function to block the material 102 from accumulating above the impact device 130, and force the material 102 downward toward the impact device 130. That is, as the impact device 130 rotates in the rotational direction 403, the material 102 may be contact the diverter 401. To bypass the diverter 401, the material 102 will move downwardly (e.g., toward the impact device 130), thus ensuring that the material 102 is contacted by the impact device 130. In aspects, the diverter 401 can extend along the length of the body portion 104 between the inlet end 180 and the exit end 182.

In aspects, the diverter 401 can extend substantially parallel to the shaft 132, with the diverter 401 positioned above the shaft 132 such that an axis 410 can intersect the diverter 401 and the shaft 132. In aspects, the axis 410 may be substantially vertical and oriented parallel to or along the direction of gravity (e.g., with the direction of gravitational force being in a vertical direction relative to the orientation of FIG. 4). The top portion 209 of the one or more walls can comprise an interior surface 415 to which the diverter 401 may be attached. In this way, the distance between the shaft 132 and the diverter 401 is reduced as compared to the distance between the shaft 132 and the interior surface 415 (e.g., on opposing sides of the diverter 401). The diverter 401 can comprise a facing wall 411 and an impact wall 413. The facing wall 411 can be spaced apart from the interior surface 415 and, in aspects, may be substantially parallel to the interior surface 415 and substantially perpendicular to the axis 410. The facing wall 411 can define the portion of the diverter 401 that is in closest proximity to the shaft 132 and the blades 142, with the axis 410 intersecting the facing wall 411 and the shaft 132. In aspects, the facing wall 411 may be substantially planar.

As the blade 142 is rotated by the shaft 132, the blade 142 may be moved into proximity with the facing wall 411 while not contacting the facing wall 411. In this way, a gap 412 between the facing wall 411 of the diverter 401 and an end of the blade 142 may be minimized. In aspects, the gap 412, that is, the distance between the facing wall 411 and the end of the blade 142, may comprise a size or distance that is less than about 50 mm, such as, for example, within a range from about 2 millimeters ("mm") to about 50 mm, or within a range from about 6 mm to about 25 mm, or within a range from about 10 mm to about 20 mm. However, in aspects, other possible dimensions are envisioned. The gap 412 is the space between the end of the blade(s) 142 and the facing wall 411 of the diverter 401 when the end of the blade 142 is in closest proximity to the facing wall 411 of the diverter 401, for example, when the blade 142 is substantially parallel to and intersected by (e.g., extending along) the axis 410. The gap 412 can represent a minimum distance between the end of the blade 142 and the facing wall 411. In this way, the gap 412 can comprise the aforementioned distance, which may be less than a distance between the end of the blade 142 and the interior surface 415. The gap 412 can be large enough such that the blades 142 do not contact the diverter 401.

In aspects, the diverter 401 can comprise the impact wall 413 that extends between the facing wall 411 and the interior surface 415. In aspects, the impact wall 413 can be positioned on a rotational side of the shaft 132 and the blade 142. For example, as used herein, the term 'rotational side' can refer to the side in which, as the shaft 132 and the blade 142 rotate in the rotational direction 403, one of the blades 142 can extend along a blade axis 414, with blade axis 414 rotating with the shaft 132 in the rotational direction 403. It will be understood that each of the blades 142 can extend along a separate blade axis wherein, in the example illustrated in FIG. 4, the blades 142, and, thus, the blade axes, may be circumferentially spaced apart about 90 degrees about the shaft 132. As such, by being positioned on a rotational side of the shaft 132 and the blade 142, the blade axis 414 can pass through or intersect the impact wall 413 of the diverter 401 (e.g., as the shaft 132 rotates in the rotational direction 403) before passing through other walls (e.g., the facing wall 411, etc.) or other portions of the diverter 401. In this way, the blade 142 can direct material or product in the rotational direction 403.

In aspects, the impact wall 413 can be angled relative to the interior surface 415 and the facing wall 411. That is, in aspects, the impact wall 413 may be non-perpendicular to the interior surface 415 and may be non-perpendicular to the facing wall 411. In further aspects, the impact wall 413 may be non-perpendicular and non-parallel to the axis 410. In aspects, the impact wall 413 can define an angle 417 relative to the interior surface 415 that is less than 90 degrees, for example, within a range from about 20 degrees to about 70 degrees, or from about 30 degrees to about 60 degrees. Likewise, the impact wall 413 can define an angle relative to the facing wall 411 that is greater than 90 degrees, for example, within a range from about 110 degrees to about 160 degrees, or from about 120 degrees to about 150 degrees. In this way, material or product that comes into contact with the impact wall 413 can be diverted downwardly in a direction toward the shaft 132. For example, the impact wall 413 can be angled relative to the interior surface 415 downwardly and toward the shaft 132.

FIG. 5 illustrates a perspective view of an inside of the top portion 209 in the opened position (e.g., similar to FIG. 3). In aspects, the inlet opening 112 can be positioned on a side of the diverter 401. For example, the diverter 401 can be positioned between a first side 505 and a second side 507. The first side 505 can face or border the impact wall 413 while the second side 507 can be on an opposite side of the diverter 401 from the first side 505. In aspects, the inlet opening 112 can be positioned on the second side 507 of the diverter 401.

Figure 6:
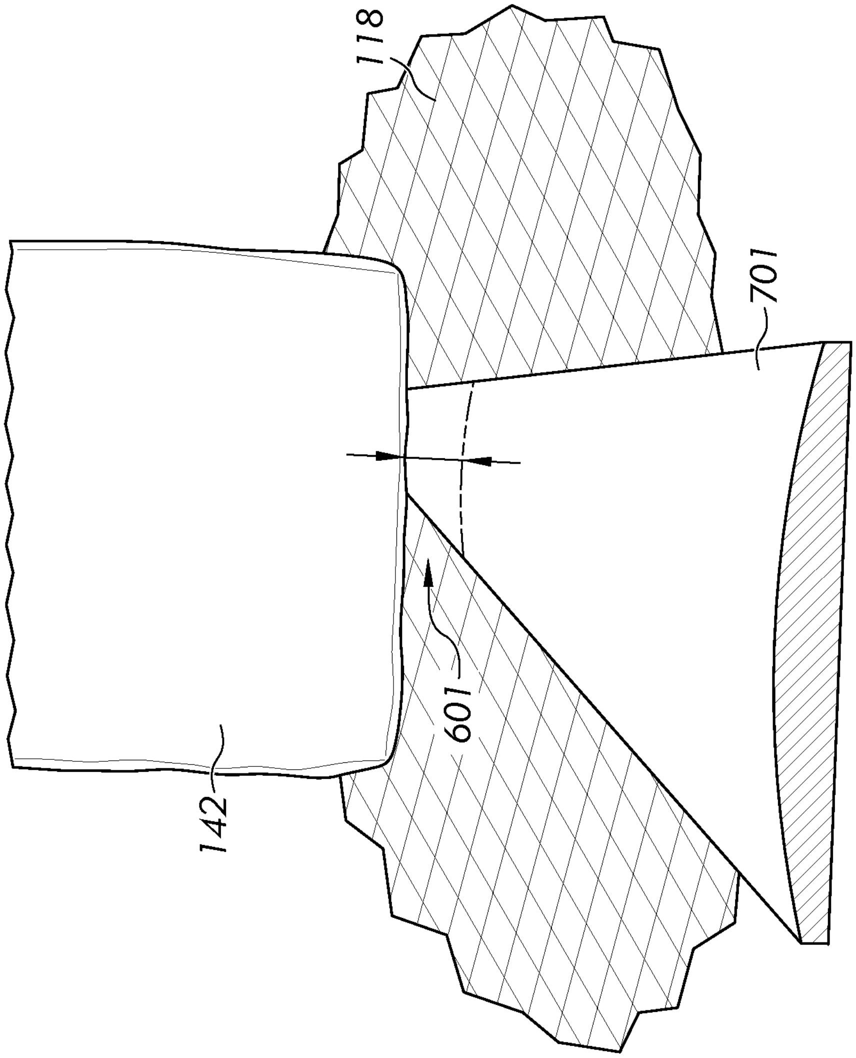
FIG. 6 schematically illustrates portions of the rotary impact separator in accordance with aspects of the disclosure.
Figure 7:
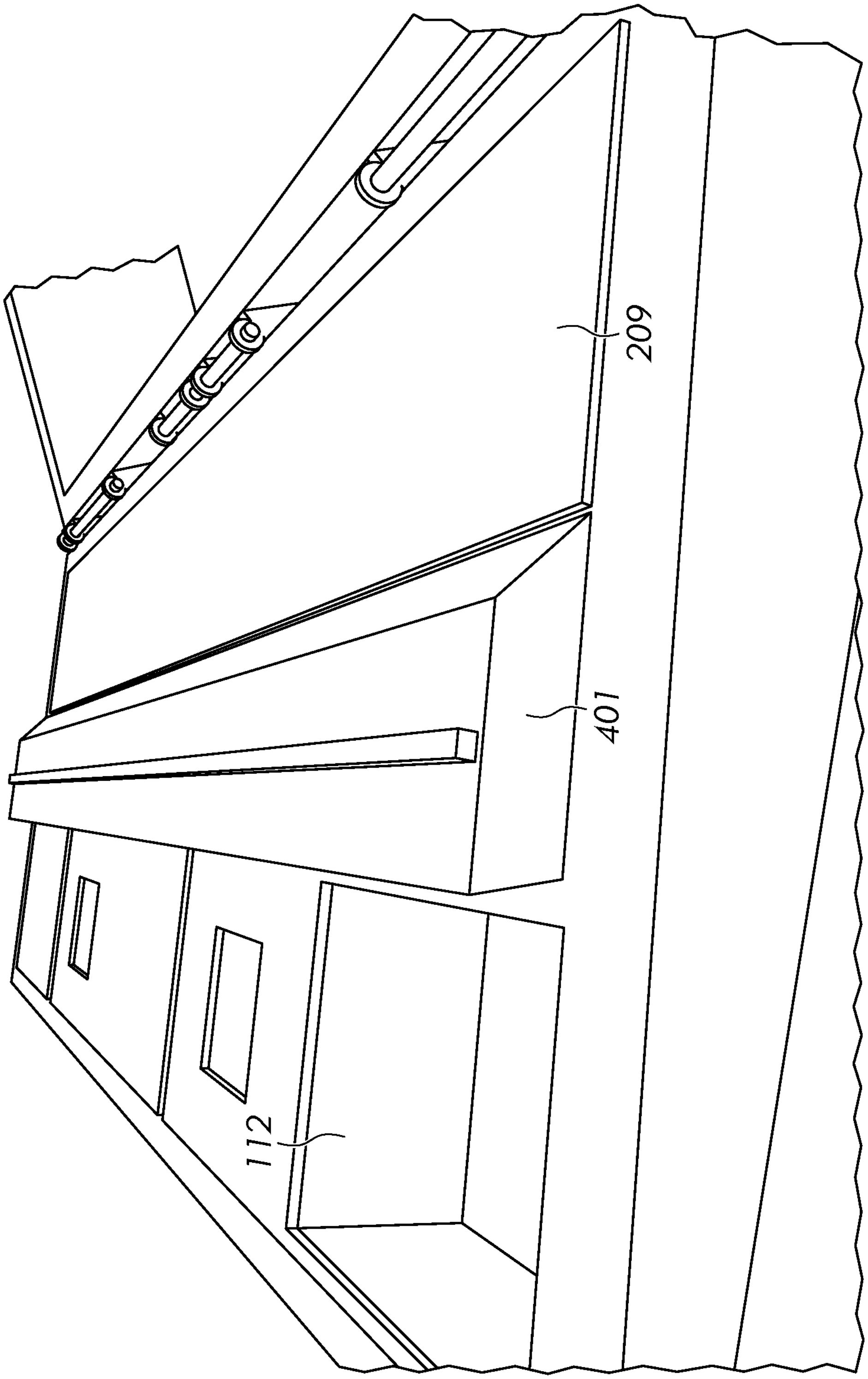
FIG. 7 schematically illustrates portions of the rotary impact separator in accordance with aspects of the disclosure.

FIG. 6 illustrates a position of the blade 142 relative to a second diverter 701 (e.g., "breaker bar") that is positioned on a bottom of the body portion 104, for example, on the screen 118, with the second diverter 701 assisting in creating turbulence within the chamber 110. An example of the position of the second diverter 701 is also illustrated in FIG. 4, wherein, in aspects, the second diverter 701 may be positioned opposite the diverter 401, with the axis 410 passing through the diverter 401 and the second diverter 701. By being on the "bottom" of the body portion 104, the second diverter 701 may be attached to the lowest point of the body portion 104 relative to a direction of gravitational force. As illustrated in FIG. 6, a relatively small gap 601 exists between the end of the blade 142 and the second diverter 701. The small gap 601 can primarily provide high shear to the material 102, which can aid in separating different components or domains, and provides several benefits. For example, by providing the small gap 601, the blade 142 is prevented from inadvertently contacting the second diverter 701, which may cause damage to one or both parts. Further, with the small gap 601, the material 102 is limited from bypassing the blade 142 and avoiding contact with the impact device 130. In this way, the material 102 can move from the second diverter 701 and toward the blade 142. FIG. 6 illustrates an example of a possible gap size (e.g., illustrated with arrowheads) between the second diverter 701 and the blade 142. In aspects, the gap 601, that is, the distance between the second diverter 701 and the end of the blade 142, may comprise a size that is less than about 50 mm, for example, within a range from about 2 millimeters ("mm") to about 50 mm, or within a range from about 6 mm to about 25 mm, or within a range from about 10 mm to about 20 mm. However, in aspects, other possible dimensions are envisioned. The second diverter 701 is also illustrated in FIG. 4. FIG. 7 illustrates a perspective view of the diverter 401 and the inlet opening 112.

Figure 9:
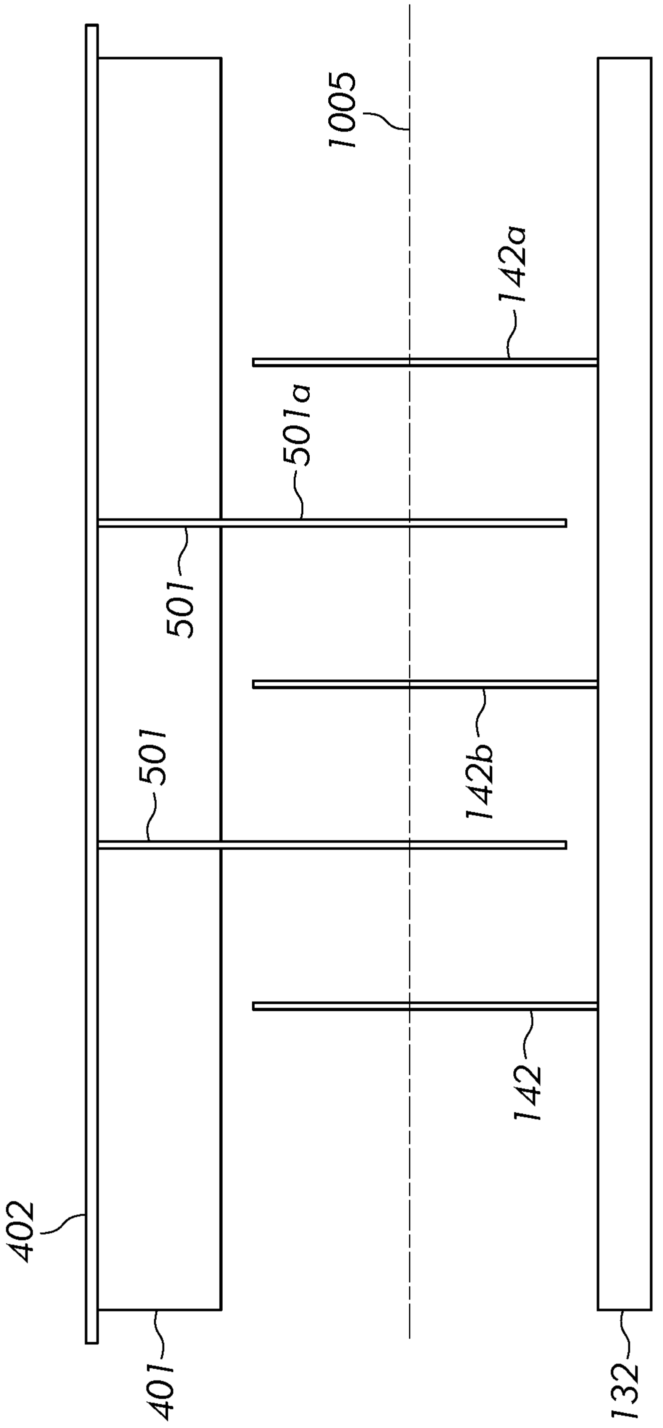
FIG. 9 schematically illustrates portions of the rotary impact separator in accordance with aspects of the disclosure.

Referring to FIGS. 5 and 9, in aspects, the rotary impact separator 100 can comprise one or more baffles 501 positioned within the chamber and attached to the top walls 203, for example, the interior surface 415. For example, the baffles 501 can extend along a plane that is perpendicular to, and intersects, the shaft 132, perpendicular to an axis along which the body portion 104 extends (e.g., between the ends 180, 182), and substantially parallel to a plane within which the blade 142 rotates. The baffles 501 can be attached, for example, to the top wall 402 (e.g., the interior surface 415) and can project downwardly from the top wall 402 toward the shaft 132. Referring to FIG. 9, a side view of the shaft 132, the blade 142, and the baffles 501 is illustrated as viewed from a perspective indicated by lines 10-10 of FIG. 4 (e.g., without a side wall 106 of the separator 100 so as not to obstruct view of the shaft 132, blades 142, baffles 501, etc.). As illustrated in FIG. 5, the baffles 501 may be substantially solid and may not comprise openings or holes, with the baffles 501 each being substantially planar and spaced apart from each other while being parallel to one another. The baffles 501 can extend from a front wall to a back wall of the body portion 104.

The baffles 501 may extend downwardly from the top wall 402 and can terminate prior to reaching the shaft 132, such that contact between the shaft 132 and the baffles 501 is limited. In aspects, the baffles 501 can extend between the blades 142 such that contact between the baffles 501 and the blades 142 is limited. For example, the blades 142 can comprise a first blade **142*a*, a second blade 142*b*, etc. that are axially spaced apart along the length of the shaft 132. In aspects, a baffle 501*a* may be positioned axially between the first blade 142*a* and the second blade 142*b*. In this way, an axis 1005 that is parallel to the shaft 132 can intersect the baffles 501 and the blades 142 (e.g., a first blade 142*a*, a second blade 142*b*, etc.). In aspects, the axial spacing (e.g., along the axis 1005) between the blades 142 and the baffles 501 may be substantially constant. For example, a first axial distance along the axis 1005 between the first blade 142*a* and the baffle 501*a* may substantially match a second axial distance along the axis 1005 between the baffle 501*a* and the second blade 142*b*. However, other possible distances are envisioned such that, in some embodiments, a non-constant spacing between the baffles 501 and the blades 142 may be provided. Accordingly, the baffles 501 and the blades 142 can comprise alternating positions along the axis 1005. In aspects, the baffles 501 may be positioned above the shaft 132 and may project downwardly (e.g., relative to a gravitational force direction) from the interior surface 415 toward the shaft 132. As illustrated in FIG. 5, one or more of the baffles 501** may comprise a substantially planar shape.

The baffles 501 can function to direct the material 102 through the chamber 110, for example, underneath the baffles 501 and toward the impact device 130. The spacing between the baffles 501 and the blades 142 can be smaller than as illustrated in FIG. 9, since FIG. 9 is merely for purposes of illustration. In aspects, the blades 142 can be angled to facilitate directing the material 102 through the chamber 110 away from the inlet opening 112 and toward the outlet openings. The baffles 501 can be selectively removed, replaced, or moved within the chamber 110 to meet requirements for different types of material 102. Likewise, the blades 142 can be removed or replaced to meet requirements for different types of material 102. While any number of distances between an end of the baffles 501 and the shaft 132 are envisioned, in aspects, the distance separating the end of the baffles 501 and the shaft 132 may be less than about 50 mm, such as, for example, within a range from about 2 millimeters ("mm") to about 50 mm, or within a range from about 6 mm to about 25 mm, or within a range from about 10 mm to about 20 mm. However, in aspects, other possible dimensions are envisioned. Accordingly, methods can comprise directing the material 102 around the diverter 401 and the baffle 501 that are attached to the rotary impact separator 100. Directing the material 102 can also comprise directing the material 102 over the second diverter 701 that is positioned opposite the diverter 401.

Figure 8:
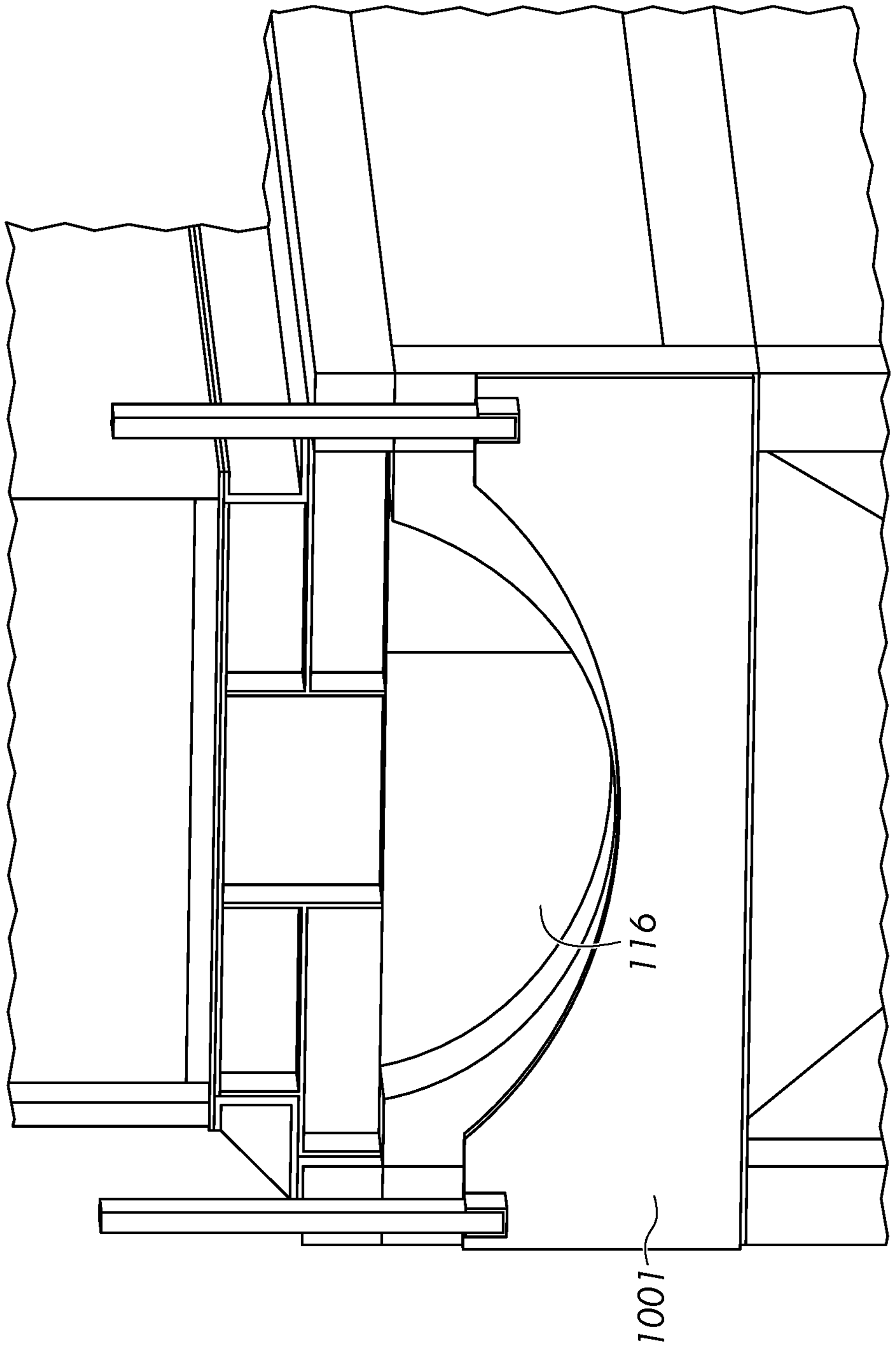
FIG. 8 schematically illustrates portions of the rotary impact separator in accordance with aspects of the disclosure.

FIG. 8 illustrates a wall 1001 that can block the second outlet opening 116 (e.g., illustrated in FIG. 1). The wall 1001 can block the second outlet opening 116 to control the amount and rate of the second co-product 122 from the chamber 110 and out of the second outlet opening 116. In aspects, the wall 1001 can be moved upwardly or downwardly to adjust how high of a barrier the second co-product 122 must pass over to exit the second outlet opening 116. The wall 1001 can be substantially solid and may not comprise openings. In aspects, a top surface of the wall 1001 can be rounded, for example, by comprising a rounded shape wherein, at a midpoint of the wall 1001, the distance between the top surface and the bottom surface of the wall 1001 is at a minimum (e.g., minimum distance). In aspects, the second co-product 122 can pass over the wall 1001. When the wall 1001 is lowered, then the inventory of the second co-product 122 exiting the second outlet opening 116 is changed. For example, a higher inventory can result in more blows from the blades 142, better separation of domains, and more time for small particles to find a hole in the screen 118 of the first outlet. When the wall 1001 is raised, then the inventory of the second co-product 122 exiting the second outlet opening 116 is changed. In aspects, the chamber 110 can be maintained at a negative pressure (e.g., a pressure lower than the ambient environment) such that dust or other particulates can be drawn from the chamber 110 to an external environment. As used herein, by changing the inventory, the material 102 can spend a longer or shorter among of time within the chamber 110 (e.g., residence time), with a higher residence time increasing the likelihood of the material 102 being broken down and exiting through the screen 118.

Additional features can be provided to facilitate separation of the material 102 into the co-products. For example, in aspects, water misting can be provided within the chamber 110 and/or a fire sprinkler unit can be provided within the chamber 110. In aspects, 46 to 140 blades/drivers may be provided spaced between about 1.5 inches to about 6 inches apart. The close spacing allows for a relatively high number of impacts per revolution of the shaft. In addition, a clearance between the second diverter 701 and the blades or between the diverter and the blades 142 may be within a range from about 0.125 inches to about 0.75 inches, which provides for efficient disassembly of the material 102. The second diverter 701 (e.g., in FIG. 6) can be positioned on the screen 118 and can cause the material 102 to impact the second diverter 701, with the material 102 moving up and over the second diverter 701, thus ensuring contact between the material 102 and the blades 142. The blades 142 may be between about 0.25 inches to about 0.75 inches higher than the screen, and the thickness of the second diverter can be changed to increase or reduce the impact force onto the material 102. In aspects, a residence time of the material 102 within the chamber 110 can be within a range from about 5 seconds to about 360 seconds. The number of blades (e.g., blades 142) can be adjusted based on need while minimizing heat build-up. In aspects, the baffles 501 can separate the chamber 110 into a plurality of distinct chambers or chamber portions, for example, with four or five separated chamber portions. This reduces the likelihood of by-pass and short circuiting of the material 102 being processed. In aspects, the shaft 132 can be rotated in either direction.

In aspects, the material 102 can be flung off the rotating blades 142 into the top portion 209. The non-circular extended top portion 209 can allow for disengagement of the material 102 from the blades 142, and then re-engagement due to the material 102 falling downwardly due to the force of gravity. As a result, "cycloning" can be prevented, which may occur in a circular cross-section housing/body which allows for the material 102 to bypass the blades 142 and avoid contact with the blades 142. In aspects, while the chamber 110 is illustrated with the diverter 401, the blades 142 may function without the diverter 401, such that the diverter 401 could be removed from the top portion 209. In general, the material 102 can contact the blades 142 and disengage (e.g., due to the rotational force and speed of the blades 142). That is, by being non-circular, the material 102 can be flung off the blades 142 as the blades 142 rotate, and then hit the top wall 203, then falling back down toward the blades 142 (e.g., a cycle of disengagement and re-engagement). Due to the gap between the end of the blades 142 and the top portion 209, the material 102 is limited or prevented from accumulating above the blades 142 and not contacting the blades 142.

In aspects, the blades 142 can be attached to a collar on the shaft 132, with the blades 142 and rotating like turbine blades on a jet engine. In aspects, the blades 142 may or may not comprise special attachments at the ends (e.g., wherein when the blades 142 do not comprise special attachments, the blades 142 are flat at the ends).

Figure 10:
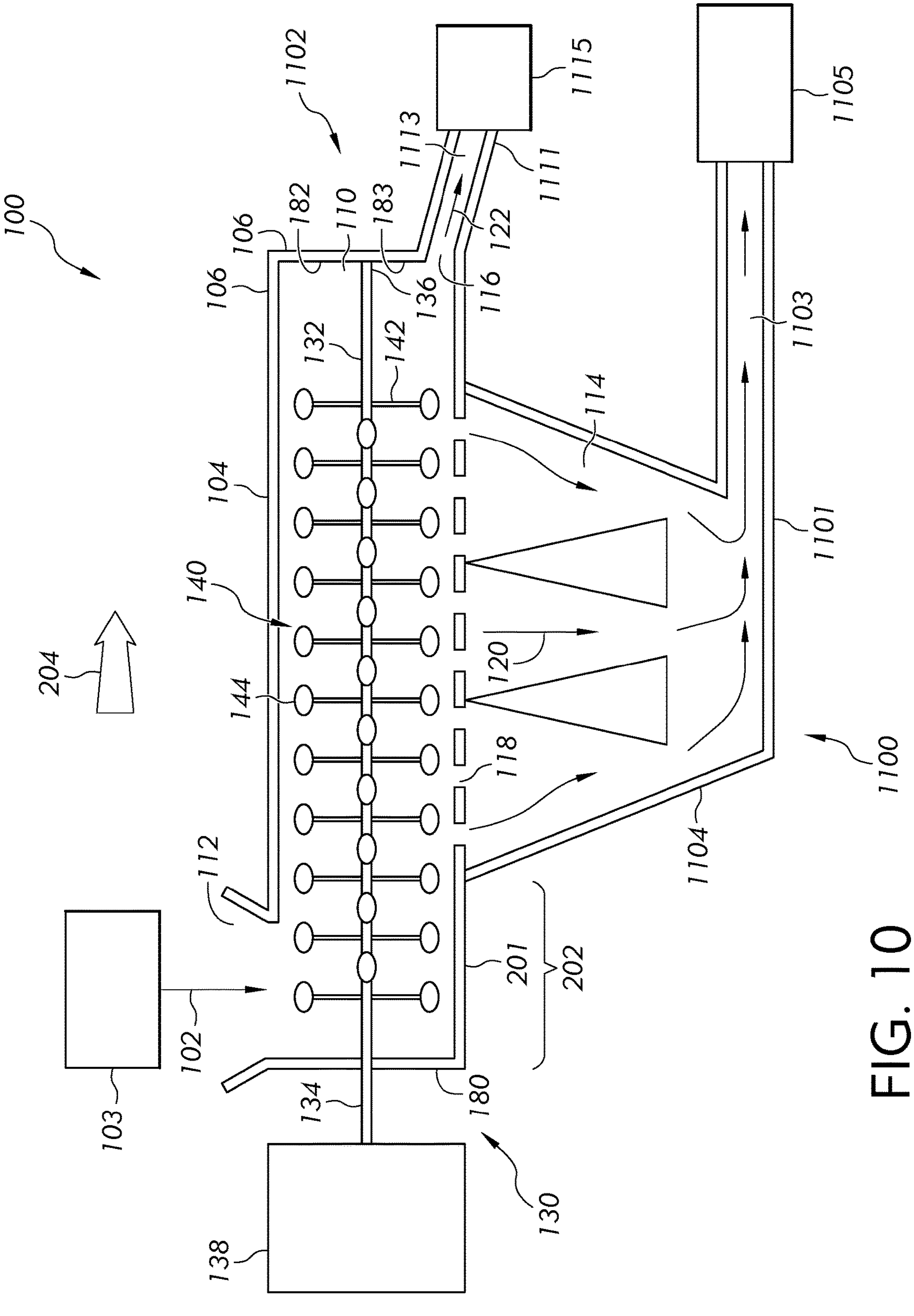
FIG. 10 schematically illustrates a side view of the rotary impact separator along lines 10-10 of FIG. 4 in accordance with aspects of the disclosure.

FIG. 10 illustrates additional aspects of the separator 100. In aspects, the separator 100 illustrated in FIG. 10 may be substantially identical to the separator 100 illustrated and described relative to FIGS. 1-9. However, the separator 100 illustrated in FIG. 10 may comprise a first guided outlet 1100 and a second guided outlet 1102. Referring first to the first guided outlet 1100, the first guided outlet 1100 can be attached to the first outlet opening 114 and can receive the first co-product 120 from the screen 118. In aspects, the first guided outlet 1100 can comprise one or more walls 1104 that are attached to the bottom wall 201 and surround the screen 118, such that the one or more walls 1104 can define the first outlet opening 114 below the screen 118. In aspects, the first guided outlet 1100 can comprise a first tube 1101 attached to the one or more walls 1104 and, as such, the first outlet opening 114. The first tube 1101 and the one or more walls 1104 can comprise a substantially enclosed volume and, in aspects, sealed volume 1103 within which the first co-product 120 can be received and through which the first co-product 120 can pass. The first co-product 120 can pass through the screen 118, through the first outlet opening 114 that is surrounded by the one or more walls 1104, and through the first tube 1101. In aspects, the first guided outlet 1100 can comprise a first pressure device 1105 that may be attached to and/or in fluid communication with the first tube 1101 and the volume 1103. The first pressure device 1105 can comprise, for example, a vacuum that uses suction to remove air from the volume 1103 and draws air toward or into the first pressure device 1105. The first pressure device 1105 can create suction via a fan driven by an electric motor, for example. In this way, the first pressure device 1105 can remove air from the volume 1103 and, thus, the outlet opening 114, which can function to raw the first co-product 120 downwardly through the screen 118 and into the outlet opening 114. Accordingly, the first pressure device 1105 can generate a negative pressure (e.g., negative pressure relative to atmospheric pressure) within the volume 1103 and can draw the first co-product 120 from the first outlet opening 114 and through the first tube 1101. Accordingly, methods can comprise generating a negative pressure within the first tube 1101 that is attached to the first outlet opening 114 such that the first pressure device 1105, which is attached to the first tube 1101, draws the first co-product 120 from the first outlet opening 114 and into the first tube 1101.

In aspects, the first co-product 120 can comprise a smaller sized particles as compared to the second co-product 122, with the first co-product 120 liberated from the material 102 by the blades 142. In aspects, if the amount or volume of the first co-product 120 is relatively low, then the first co-product 120 can be periodically removed by hand after collecting under the separator 100. If the amount or volume of the first co-product 120 is higher, then the first co-product 120 can be removed continuously. In such an example, to remove the first co-product 120 continuously, a conveyor can be positioned below the separator 100 to allow the conveyor to collect and transport the first co-product 120. To further improve the removal of the first co-product 120, the separator 100 can comprise the first guided outlet 1100 with the first pressure device 1105, which can draw or pull the first co-product 120 through and from the screen 118. In aspects, to further facilitate removal of the first co-product 120 by the first guided outlet 1100, the one or more walls 1104 can comprise a relatively steep angle (e.g., greater than 45 degrees to the direction of gravity, for example) to limit the first co-product 120 from adhering to the one or more walls 1104. In aspects, the one or more walls 1104 can comprise an angle to the horizontal plane that is greater than the angle of repose of the first co-product 120. In further aspects, vibratory or other mechanical structures can be provided to facilitate movement of the first co-product 120 through the first outlet opening 114. Accordingly, the angled walls 1104 can serve to funnel the first co-product 120 to a pneumatic pick-up point, from which the first co-product 120 can be transported to the next processing step. further, by providing the first pressure device 1105, the volume 1103 can operate at a slightly negative pressure relative to atmospheric pressure due to the drawing of air (e.g., and the first co-product 120) through a pneumatic pick-up point. Because the one or more walls 1104 may be tightly sealed to the bottom wall 201, the air can be pulled through the screen 118 at the bottom of the separator 100. As the air moves through the screen 118, fine particles may be dragged, which can increase the separation of fine and coarse particles that occurs within the chamber 110. In further aspects, a small amount of air can also be injected or drawn in through ports in the one or more walls 106 to facilitate the transport of heavier first co-product 120 materials.

The second guided outlet 1102 may function similarly to the first guided outlet 1100. For example, the second guided outlet 1102 can receive the second co-product 122 from the chamber 110. In aspects, the second guided outlet 1102 can comprise a second tube 1111 attached to the end wall 183. The second tube 1111 can surround the second outlet opening 116 and can comprise a substantially enclosed volume 1113 within which the second co-product 122 can be received and through which the second co-product 122 can pass. In aspects, the second guided outlet 1102 can comprise a second pressure device 1115 that may be attached to and/or in fluid communication with the second tube 1111 and the volume 1113. The second pressure device 1115 can comprise, for example, a vacuum that uses suction to remove air from the volume 1113 and draws air toward or into the second pressure device 1115. The second pressure device 1115 can create suction via a fan driven by an electric motor, for example. In this way, the second pressure device 1115 can remove air from the volume 1113 to draw the second co-product 122 into the second outlet opening 116. In aspects, the second tube 1111 may comprise an opening such that the second tube 1111 may not be sealed with the chamber 110. In this way, the second pressure device 1115 can pull transport air through the opening in the second tube 1111 and from the atmosphere (e.g., and not from the chamber 110). This can maximize the amount of air that is pulled through the screen 118 by the first pressure device 1105. In aspects, the second pressure device 1115 can generate a negative pressure (e.g., negative pressure relative to atmospheric pressure) within the volume 1113 and can draw the second co-product 122 from the second outlet opening 116 and through the second tube 1111. Accordingly, methods can comprise generating a negative pressure within the second tube 1111 that is attached to the second outlet opening 116 such that the second pressure device 1115, which is attached to the second tube 1111, draws the second co-product 122 from the second outlet opening 116 and into the second tube 1111.

In aspects, the first co-product 120 can comprise smaller sized particles as compared to the second co-product 122, with the first co-product 120 liberated from the material 102 by the blades 142. In aspects, if the amount or volume of the first co-product 120 is relatively low, then the first co-product 120 can be periodically removed by hand after collecting under the separator 100. If the amount or volume of the first co-product 120 is higher, then the first co-product 120 can be removed continuously. In such an example, to remove the first co-product 120 continuously, a conveyor can be positioned below the separator 100 to allow the conveyor to collect and transport the first co-product 120. To further improve the removal of the first co-product 120, the separator 100 can comprise the first guided outlet 1100 with the first pressure device 1105, which can draw or pull the first co-product 120 through and from the screen 118. In aspects, the second co-product 122 can comprise larger sized particles than the first co-product 120, with the second co-product 122 too large to pass through the screen 118.

While one screen 118 is illustrated herein, the rotary impact separator 100 is not so limited. Rather, in aspects, the rotary impact separator 100 can comprise a plurality of screens, for example, a first screen, a second screen, etc. The different screens may comprise differently sized openings such that a co-product of a first size may pass through a first screen, while a co-product of a different size may pass through a second screen. In aspects, the plurality of screens may be positioned at substantially the same location as the screen 118 is positioned, with the co-products of the first screen kept separate from the co-products of the second screen after passing through the first screen and the second screen. In addition, or in the alternative, two guided outlets (e.g., which may each be substantially identical to the first guided outlet 1100) may be operatively associated with each of the plurality of screens, such that one guided outlet may remove the co-product that passes through the first screen, and a second, different, guided outlet may remove the co-product that passes through the second screen. In addition, or in the alternative, the rotary impact separator 100 is not limited to comprising the guided outlets 1100, 1102 described herein. Rather, in aspects, instead of the guided outlets 1100, 1102, the rotary impact separator 100 may comprise other options for removing the co-products 120, 122, such as, for example, conveyors, belts, hoppers, etc. Further, while the guided outlets 1100, 1102 are illustrated with separate pressure devices 1105, 1115, in aspects, the guided outlets 1100, 1102 can comprise a single, common pressure device or vacuum that can generate the negative pressure within the first tube and/or the second tube.

It should be understood that while various aspects have been described in detail relative to certain illustrative and specific examples thereof, the present disclosure should not be considered limited to such, as numerous modifications and combinations of the disclosed features are possible without departing from the scope of the following claims.

What is claimed is:

1. A rotary impact separator for separating a material, the rotary impact separator comprising:
- a body portion comprising one or more walls, the one or more walls defining:
  - a substantially hollow chamber;
- an inlet opening, in communication with the hollow chamber, through which the material is received;
  - a first outlet opening, in communication with the hollow chamber, through which a first co-product of the material exits the hollow chamber;
  - a second outlet opening, in communication with the hollow chamber, through which a second co-product of the material exits the hollow chamber;
- a screen covering a first outlet in the body portion below an impact device relative to a direction of gravity, the screen attached to the body portion in a fixed and non-rotating position;
- the impact device extending at least partially into the hollow chamber defined within the body portion, the impact device comprising:
  - a shaft that extends within the hollow chamber, the shaft configured to rotate within the hollow chamber; and one or more blades attached to the shaft and configured to contact the material and separate the material into the first co-product and the second co-product; and a diverter attached to an interior surface of one of the one or more walls and not in contact with the screen, the diverter extending along the shaft and projecting from the interior surface toward the shaft such that a gap is defined between an end of a first blade of the one or more blades and the diverter, the gap comprising a distance that is less than a distance between the end of the first blade and the interior surface.

2. The rotary impact separator of claim 1, wherein the diverter extends substantially parallel to the shaft and wherein the distance of the gap is less than 50 mm when the end of the first blade is in closest proximity to the diverter.

3. The rotary impact separator of claim 2, wherein the diverter is attached at a top of the body portion such that an axis that is parallel to a direction of gravitational force intersects the diverter and the shaft.

4. The rotary impact separator of claim 3, wherein the diverter comprises an impact wall that is angled relative to the interior surface to form an angle that is less than 90 degrees, the impact wall positioned on a rotational side of the first blade.

5. The rotary impact separator of claim 1, further comprising a second diverter attached to a bottom of the body portion and positioned opposite the diverter.

6. The rotary impact separator of claim 1, further comprising a baffle attached to the interior surface and extending along a plane that interests the shaft, the baffle projecting from the interior surface toward the shaft and positioned between the first blade and a second blade of the one or more blades.

7. The rotary impact separator of claim 1, further comprising a first tube attached to the first outlet opening and defining an enclosed volume, a first pressure device attached to the first tube and configured to generate a negative pressure within the enclosed volume and draw the first co-product from the first outlet opening.

8. The rotary impact separator of claim 1, further comprising a second tube attached to the second outlet opening, a second pressure device attached to the second tube and configured to generate a negative pressure to draw the second co-product from the second outlet opening.

9. A rotary impact separator for separating a material, the rotary impact separator comprising:

a body portion comprising one or more walls, the one or more walls defining:

a substantially hollow chamber;

an inlet opening, in communication with the hollow chamber, through which the material is received;

a first outlet opening, in communication with the hollow chamber, through which a first co-product of the material exits the hollow chamber;

a second outlet opening, in communication with the hollow chamber, through which a second co-product of the material exits the hollow chamber;

an impact device extending at least partially into the hollow chamber defined within the body portion, the impact device comprising:

a shaft that extends within the hollow chamber, the shaft configured to rotate within the hollow chamber; and one or more blades attached to the shaft and configured to contact the material and separate the material into the first co-product and the second co-product; and a baffle attached to an interior surface of one or more walls such that the shaft rotates relative to the baffle and relative to a stationary and non-rotating screen, the baffle extending along a plane that intersects the shaft, the baffle projecting from the interior surface toward the shaft and positioned between a first blade of the one or more blades and a second blade of the one or more blades.

10. The rotary impact separator of claim 9, further comprising a first tube attached to the first outlet opening and defining an enclosed volume, a first pressure device attached to the first tube and configured to generate a negative pressure within the enclosed volume and draw the first co-product from the first outlet opening.

11. The rotary impact separator of claim 10, further comprising a second tube attached to the second outlet opening, a second pressure device attached to the second tube and configured to generate a negative pressure to draw the second co-product from the second outlet opening.

12. The rotary impact separator of claim 11, wherein the first pressure device and the second pressure device remove air from the hollow chamber.

13. A method for recovering two or more co-products from a material, the method comprising:

receiving the material within a hollow chamber of a rotary impact separator;

passing the material through the rotary impact separator comprising a body portion with one or more walls that define a chamber, an impact device that extends through the chamber, and a screen covering a first outlet in the body below the impact device relative to the direction of gravity;

rotating the impact device within the chamber and contacting the material with the impact device; and directing the material around a diverter and a baffle that are attached to the rotary impact separator, the diverter comprising an impact wall that is configured impact a material and direct the material in a desired direction; and separating the material into a first co-product and a second co-product such that the first co-product exits the rotary impact separator through a first outlet opening and the second co-product exits the rotary impact separator through a second outlet opening.

14. The method of claim 13, further comprising generating a negative pressure within a first tube that is attached to the first outlet opening such that a first pressure device, which is attached to the first tube, draws the first co-product from the first outlet opening and into the first tube.

15. The method of claim 14, further comprising generating a negative pressure within a second tube that is attached to the second outlet opening such that a second pressure device, which is attached to the second tube, draws the second co-product from the second outlet opening and into the second tube.

16. The method of claim 13, wherein the baffle is positioned between a first blade and a second blade of the impact device such that an axis that is parallel to a shaft of the impact device intersects the baffle, the first blade, and the second blade.

17. The method of claim 16, wherein a distance separating an end of the blades and the diverter is less than 50 mm.

18. The method of claim 17, wherein the impact wall is angled toward the shaft such that the impact wall directs the material toward the shaft.

19. The method of claim 18, wherein the diverter directs the material downwardly relative to a direction of gravitational force toward the shaft.

20. The method of claim 19, wherein directing the material comprises directing the material over a second diverter that is positioned opposite the diverter.

* * * * *